(12) United States Patent
Lanig et al.

(10) Patent No.: US 7,133,694 B2
(45) Date of Patent: Nov. 7, 2006

(54) METHOD AND APPARATUS FOR TRANSMITTING VOICE INFORMATION IN A MOBILE RADIO NETWORK

(75) Inventors: Eva Maria Lanig, Germering (DE); Josef Weinhappl, Vienna (AT); Alexander Vesely, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 811 days.

(21) Appl. No.: 09/902,349

(22) Filed: Jul. 10, 2001

(65) Prior Publication Data
US 2003/0013488 A1 Jan. 16, 2003

(51) Int. Cl.
*H04B 1/38* (2006.01)
*H04M 1/00* (2006.01)
*H04M 3/42* (2006.01)
*H04Q 7/20* (2006.01)

(52) U.S. Cl. .............. 455/560; 455/416; 455/436; 455/560

(58) Field of Classification Search ............. 455/436, 455/416, 560
See application file for complete search history.

(56) References Cited

U.S. PATENT DOCUMENTS
5,608,779 A * 3/1997 Lev et al. ............ 455/436
6,574,469 B1 * 6/2003 Xiang et al. ............ 455/416

FOREIGN PATENT DOCUMENTS
WO WO 93/00778 1/1993

* cited by examiner

*Primary Examiner*—Wing Chan
*Assistant Examiner*—Thjuan P. Knowlin
(74) *Attorney, Agent, or Firm*—Bell, Boyd & Lloyd LLC

(57) ABSTRACT

Method and apparatus for efficient transmission of bits of voice information through a mobile radio network, which transmission saves transmission capacities and which makes it possible to mix-in announcements or to mix the bits of speech information of a number of callers during a conference call, is enabled such that its of voice information, dependent on the event, are converted in the mobile radio network into a transcoded format, are further processed, are converted into a non-transcoded format and are transmitted in a non-transcoded format.

11 Claims, 1 Drawing Sheet

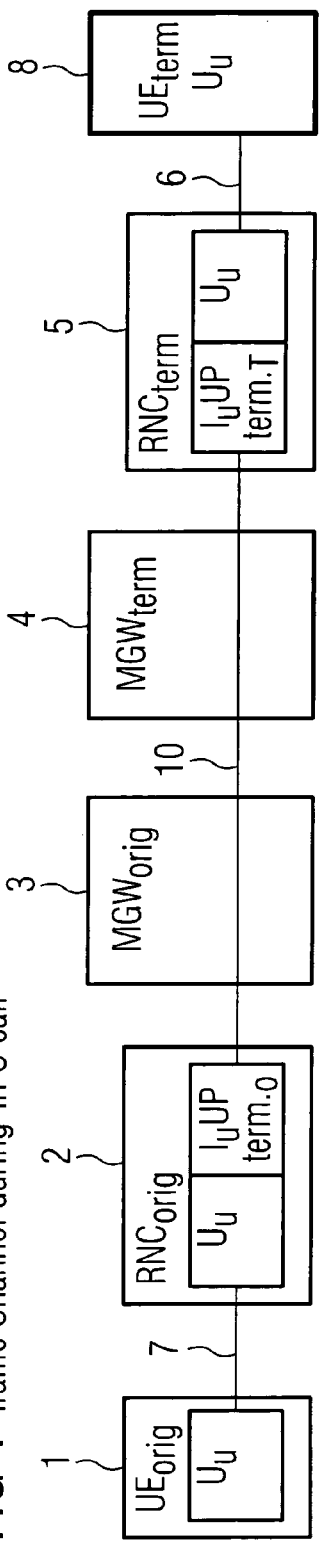
FIG 1  Traffic Channel during TrFO call
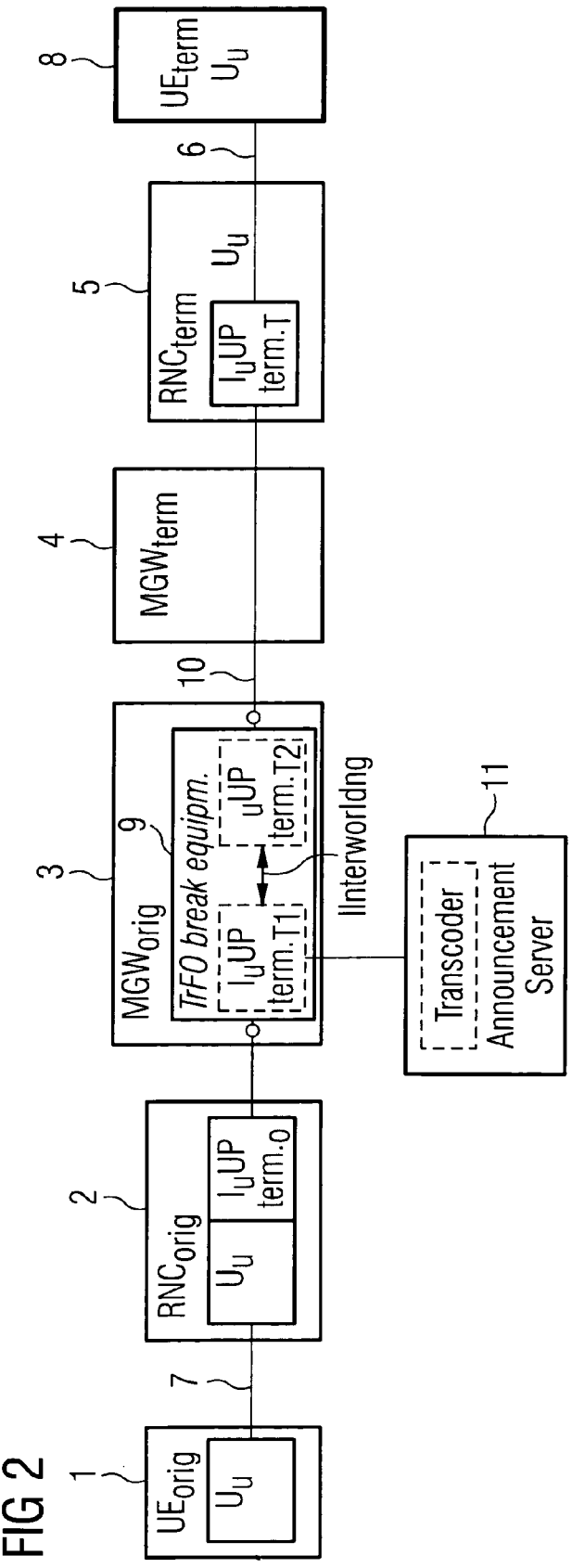
FIG 2

METHOD AND APPARATUS FOR TRANSMITTING VOICE INFORMATION IN A MOBILE RADIO NETWORK

BACKGROUND OF THE INVENTION

1. Field of the Invention

The present invention relates to a method and an apparatus for transmitting voice information representing language through the core network of a mobile radio network, between connected core networks of mobile radio networks, and from mobile radio networks to wire-bound users of a PSTN.

2. Description of the Prior Art

As it is known from different manual textbooks such as Jacek Biala, 1994, ISBN-3-528-15302-4, Vieweg Verlag, mobile radio communication occurs between two mobile stations in a mobile radio network from a mobile station (User Equipment UE) via an air interface (Air Interface/Radiolink) to a base station (or, respectively, a Radio Network Controller RNC) via switching centers (Mobile Switching Centers MSCs or Media Gateways MGW) and via a further base station to a second mobile station (UE). Since a number of users normally telephone in a mobile radio network, considerable amounts of data are transmitted via the core network of a mobile radio network; particularly, between switching centers (media gateways).

It is proposed in WO93/00778A1 to transmit voice data in the core network of a mobile radio network in a compressed format and not in a 64 kb/s-FCM format. As a compressed format, WO93/00778A1 suggests the voice data compression format used between mobile stations and base stations/radionet controller (e.g., according to UMTS) for optimally utilizing the extremely limited channel capacities on an air interface; voice data therefore being transmitted in the format (for example, according to UMTS standard) in which they are transmitted via an air interface also within the core network of the mobile radio network. For this purpose, known (under UMTS, etc.) transcoders (which, in a base station or MSC etc., previously have converted voice data from the compressed air interface format into a non-compressed 64 kb/s-PCM format for the transmission in the core network of a mobile radio network) are switched off or, respectively, are bypassed (Transcoder-Free-Operation=TrfO=Uncoded Operation.

However, it is difficult to implement this transmission method since the transmission of voice data in a mobile radio network in the TrfO data format in the core network does not allow many features such as mixing voice data of a number of callers given a conference call or importing tones or announcements into transmitted voice data.

An object of the present invention, therefore, is to enable an optimized use of transmission resources, when bits of voice information are transmitted in a mobile radio network, by avoiding the above disadvantages.

SUMMARY OF THE INVENTION

Accordingly, dependent on parameters/results (such as an intended playing of tones or announcements or intended conference circuits), the inventive TranscoderFreeOperationBreakEquipment (TBE=device for interrupting a transcoder-free transmission by transcoding) is or is not switched through a telecommunication network into the transmission path of voice data. When the TBE is switched into the TrFO transmission path of voice data through a telecommunication network, the data are transcoded, further processed (mixed with announcements or bits of voice information of another call partner of a conference duplicated for tapping measures, etc.) and are compressed again into a TrFO format prior to a transmission to another media gateway or a switch.

This makes it possible to optimally use the transmission resources in a mobile radio network and still allow for the execution of functions that are not possible with respect to the transcoded transmission from the mobile radio terminal device through the mobile radio network (=without transforming into a non-transcoded format in a transcoder) such as playing tones or mixing a quantity of voice information given a conference circuit.

Additional features and advantages of the present invention are described in, and will be apparent from, the Detailed Description of the Preferred Embodiments and the Drawings.

DESCRIPTION OF THE DRAWINGS

FIG. 1 schematically shows the transmission from a mobile radio terminal device through a mobile radio network to a further mobile radio terminal device; and FIG. 2 shows the transmission from a mobile radio terminal device to another mobile radio terminal device through a mobile radio network.

DETAILED DESCRIPTION OF THE PREFERRED EMBODIMENTS

FIG. 1 shows a mobile radio terminal device ($UE_{ORIG}$) 1 from which bits of voice information are transmitted via a base station and base station control ($RNC_{ORIG}$ in UMTS) 2, a voice information transmitting device 3 (Switch/MGW-$_{ORIG}$), a further voice information transmitting device (Switch/MGW$_{Term}$) 4 USW, a further base station/base station control device ($RNC_{Term}$) 5 and a further air interface 6 to a mobile radio terminal device 7 ($UEW_{Term}$) receiving the voice information. Given a traditional voice transmission, bits of voice information are transmitted from the mobile radio terminal device 1 via the air interface 7 to the RNC 2 and from the RNC 5 via the air interface 6 to the receiving mobile radio terminal device 8 (UETerm) in a compressed (=non-transcoded) format. Traditionally, a transcoder converts these compressed voice data (for example 16 kb/s) into a non-compressed format (=transcoded, e.g. 64 kb/s-PCM) for the transmission via the line switches or packet switching centers 3, 4 (or fixed network switches or packet switching centers). Given a Transcoder-Free-Operation, the compressed bits of voice information (that are already transmitted via the air interface 7 with 16 kb/s-format, for example) are transmitted in this compressed format up to the receiving mobile station 8 (or alternatively up to a transition into a fixed network) instead of the converted data with 64 kb/s-format. Given this transmission of voice information without transcodings in a transcoder (in 2 or 3) into a non-compressed format, it is problematic to mix-in bits of voice information of a number of mobile stations (1, 8 USW) for a conference circuit or to mix tones or announcements into bits of voice information. Therefore, it is inventively proposed to provide a feeding device 9 as shown in FIG. 2 (Trf0 Break Equipment=TrfO interruption device 9), wherein the feeding device 9, dependent on the event (an event is a planned conference, playing of announcements, interception, etc., for example), converts bits of voice information in the mobile radio network into a transcoded format, further processes them (e.g., mixing voice data of the conference partners for a planned conference, mixing these announcements with bits of voice information for playing announcements, duplicating the voice data for an interception, etc.), converts them into a non-transcoded format and has them further transmitted (10) in a non-transcoded format.

The conversion device for converting bits of voice information into a transcoded format and/or for (back-) converting (subsequent to the further processing) into a non-transcoded format can be a traditional transcoder in the media gateway or switch or can be situated somewhere else and can be driven by it or, respectively, by an inventive device situated there (TranscoderBreakFunction).

Although the present invention has been described with reference to specific embodiments, those of skill in the art will recognize that changes may be made thereto without departing from the spirit and scope of the invention as set forth in the hereafter appended claims.

We claim as our invention:

1. A method for transmitting voice information through a mobile radio network, the method comprising the steps of:
   converting the voice information, dependent on an event, in the mobile radio network into a transcoded format;
   processing the voice information to incorporate said event into voice information data:
   converting the voice information into a non-transcoded format; and
   transmitting the voice information in the non-transcoded format.

2. A method for transmitting voice information through a mobile radio network as claimed in claim 1, wherein the event is an intended importing of one of announcements, tones, and other information into a conversation represented by the transmitted voice information, wherein the step of processing includes importing the one of announcements, tones, and other information into the conversation by a mixing device, and wherein the step of transmitting includes transmission in a core network of the mobile radio network.

3. A method for transmitting voice information through a mobile radio network as claimed in claim 1, wherein the event is one of an intended handover in the mobile radio network, and an intended handover to another mobile radio network.

4. A method for transmitting voice information through a mobile radio network as claimed in claim 1, wherein the event is an intended duplication of the voice information for a legal tapping process.

5. A method for transmitting voice information through a mobile radio network as claimed in claim 1, wherein the step of transmitting occurs from a radio network controller to one of another radio network controller of the mobile radio network and a gateway into another network.

6. A method for transmitting voice information through a mobile radio network as claimed in claim 1, wherein the conversions are initiated by a feeding device in a media gateway of the mobile radio network.

7. A method for transmitting voice information through a mobile radio network as claimed in claim 3, wherein, in the case of the event being a handover in the mobile radio network, co-heard user plane information is handed over to a new radio network controller that is not yet actively switched in order to enable an interruption-free changeover during the handover.

8. An apparatus for transmitting voice information through a mobile radio network, comprising:
   a conversion device;
   a part for processing; and
   a transmission part;
   wherein the voice information, dependent on an event, is converted via the conversion device into a transcoded format, is further processed via the part for processing, is again converted in the conversion device into a non-transcoded format, and is transmitted by the transmission part, in the non-transcoded format, via an interface to one of another media gateway and switch.

9. An apparatus for transmitting voice information through a mobile radio network as claimed in claim 8, wherein the apparatus includes a media gateway.

10. An apparatus for transmitting voice information through a 30 mobile radio network as claimed in claim 8, further comprising one of a mixing device and a driving part for driving the mixing device for mixing the voice information in the transcoded format with one of announcements, tones and other information.

11. A method for transmitting voice information through a mobile radio network, the method comprising the steps of:
   detecting if there is a request for importing announcement data, tone data or other data into the transmitted voice information;
   converting the voice information in the mobile radio network into a transcoded format when said request is detected;
   processing the voice information and importing the requested data into the conversation by a mixing device;
   converting the voice information into a non-transcoded format; and
   transmitting the voice information in the non-transcoded format through a core network of the mobile radio network.

* * * * *